(12) United States Patent
Condorelli et al.

(10) Patent No.: US 7,151,829 B2
(45) Date of Patent: Dec. 19, 2006

(54) SYSTEM AND METHOD FOR IMPLEMENTING A HASH ALGORITHM

(75) Inventors: Vincenzo Condorelli, Poughkeepsie, NY (US); Camil Fayad, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 10/127,393

(22) Filed: Apr. 22, 2002

(65) Prior Publication Data

US 2003/0198342 A1    Oct. 23, 2003

(51) Int. Cl.
*H04K 1/00* (2006.01)

(52) U.S. Cl. .............................. 380/28; 380/29; 380/30; 380/37; 713/180; 713/181

(58) Field of Classification Search ............ 380/25–30, 380/37; 713/180–181, 168
See application file for complete search history.

(56) References Cited

U.S. PATENT DOCUMENTS

| | | | | |
|---|---|---|---|---|
| 4,881,264 A | 11/1989 | Merkle | | 380/25 |
| 5,231,668 A | 7/1993 | Kravitz | | 380/28 |
| 5,448,639 A | 9/1995 | Arazi | | 380/30 |
| 5,751,809 A | 5/1998 | Davis et al. | | 380/23 |
| 5,809,145 A | 9/1998 | Slik et al. | | 380/25 |
| 5,892,829 A | 4/1999 | Aiello et al. | | 380/25 |
| 5,903,651 A | 5/1999 | Kocher | | 380/25 |
| 5,953,502 A | 9/1999 | Helbig, Sr. | | 395/186 |
| 5,963,646 A | 10/1999 | Fielder et al. | | 380/21 |
| 5,991,414 A | 11/1999 | Garay et al. | | 380/25 |
| 6,003,135 A | 12/1999 | Bialick et al. | | 713/201 |
| 6,021,201 A * | 2/2000 | Bakhle et al. | | 713/189 |
| 6,091,821 A * | 7/2000 | Buer | | 380/30 |
| 6,141,421 A * | 10/2000 | Takaragi et al. | | 380/30 |
| 6,829,355 B1* | 12/2004 | Lilly | | 380/28 |
| 2002/0184498 A1* | 12/2002 | Qi | | 713/168 |

FOREIGN PATENT DOCUMENTS

WO      WO 98/31122      7/1998

OTHER PUBLICATIONS

U.S. Department of Commerce, Technology Administration, National Institute of Standards and Technology; FIPS PUB 180-1 Federal Information Processing Standards Publication; "Secure Hash Standard" Category Computer Security: Apr. 17, 1995.
"Applied Cryptography Second Edition: Protocols, Algorithms, and Source Code in C"; Chapter 18; Copyright 1996 by Bruce Schneler; published by John Wiley & Sons, Inc.
"LFSR-based Hashing and Authentication"; Hugo Krawczyk, IBM T.J. Watson Research Center, Yorktown Heights, NY 10598.

* cited by examiner

*Primary Examiner*—Kim Vu
*Assistant Examiner*—Baotran N. To
(74) *Attorney, Agent, or Firm*—Cantor Colburn LLP

(57) ABSTRACT

A system and method for generating a message digest comprising: receiving a block of data and processing the block of data to achieve a message digest, the processing of the block of data including evaluating the block of data at time (t) in terms of time (t−x), wherein x is greater than or equal to 2.

12 Claims, 8 Drawing Sheets

SYSTEM AND METHOD FOR IMPLEMENTING A HASH ALGORITHM

BACKGROUND OF THE INVENTION

Cryptography fundamentally comprises the processes of enciphering and deciphering messages so that their content is not readily accessible. These processes depend on particular algorithms, known as ciphers. A key is used in conjunction with a cipher to encipher and decipher messages. The key might appear meaningful, as would be the case with a character string used as a password, but this transformation is irrelevant—the functionality of a key lies in its being a string of bits determining the mapping of the plain text to the enciphered text. While protecting access to information is a major reason for using cryptographic systems, such systems are increasingly being used for identification of individuals and for authentication and non-repudiation.

One form of cryptographic identification/authentication is known as a digital signature. A digital signature is used to ensure that a message has been generated by a given individual and that the message received by an intended recipient is the message originally generated by the given individual. More specifically, hashing algorithms are a preferred mechanism used by digital signature systems to generate message "fingerprints" which are used to verify the authenticity of a message. One type of hashing algorithm, known as a one-way hashing algorithm, receives as input a message of arbitrary length and outputs a unique fixed length message known as a hash value or message digest. Although it is easy to determine a message digest given an input message and a one way hash algorithm, it is generally infeasible to determine an input message given the algorithm and the message digest. Moreover, hash algorithms are developed such that it is generally infeasible for random messages individually applied as inputs to a given hash algorithm to cause the generation of identical message digests. Consequently, message digests generated using one-way hashing algorithms are well suited for use as message fingerprints.

As the number of entities engaging in electronic transactions continues to increase so does the necessity for reliable and efficient cryptographic identification/authentication. Increases in the number of electronic transactions coupled with the use of computationally intensive identification/authentication mechanisms has resulted in proportionate increases in the need for additional computational resources. One method for satisfying this need is to develop more efficient algorithms such that additional/complex transactions may be supported using existing resources and without incurring the financial and other costs that would otherwise be unavoidable. The present application discloses a system and method for implementing a hashing algorithm.

SUMMARY OF THE INVENTION

A system and method for generating a message digest comprising: receiving a block of data and processing the block of data to achieve a message digest, the processing of the block of data including evaluating the block of data at time (t) in terms of time (t−x), wherein x is greater than or equal to 2.

DETAILED EMBODIMENT

Figure 1:
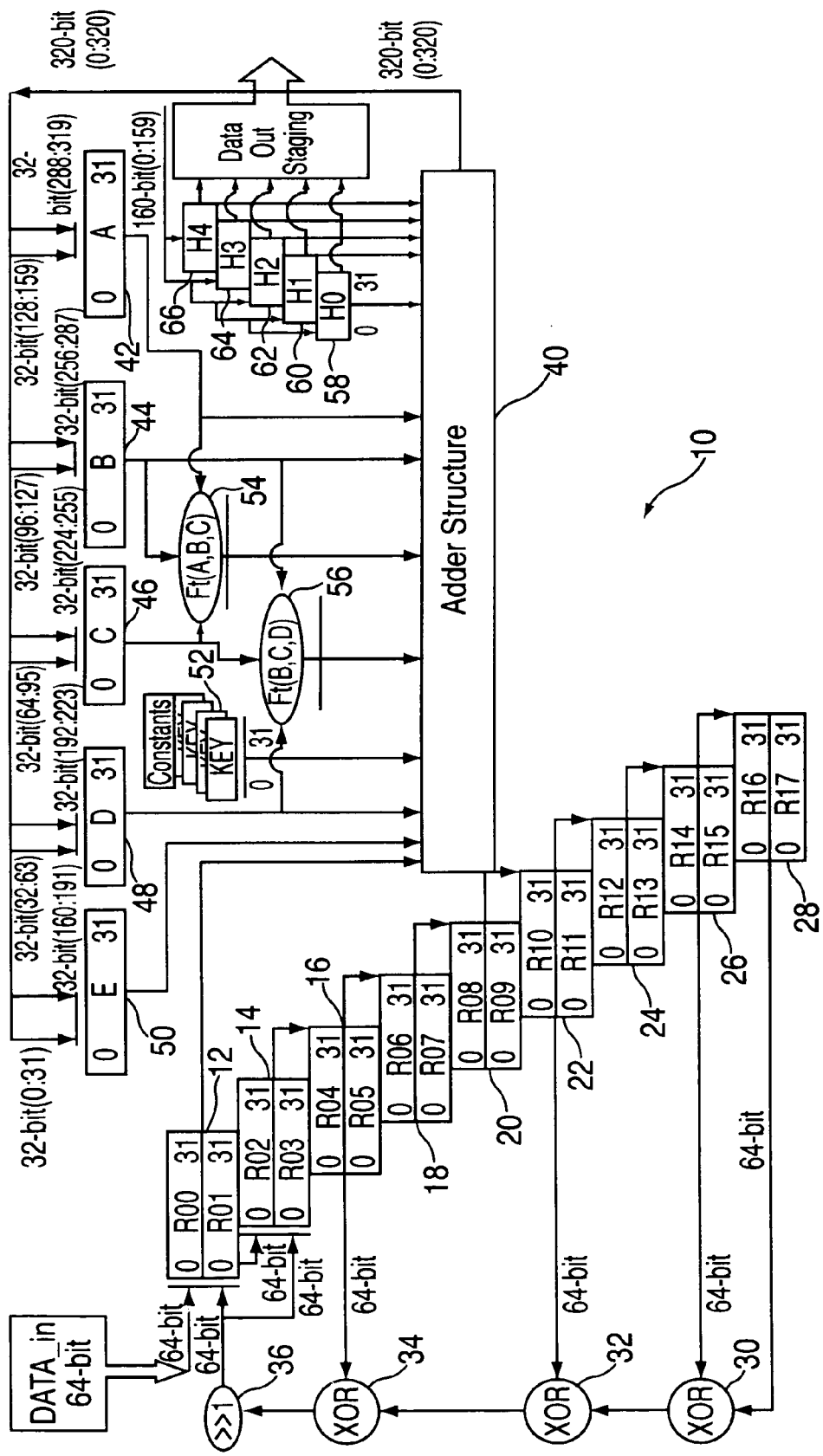
FIG. 1 is a hardware diagram for an implementation of a 160-bit message digest generator requiring at most 41 cycles to generate the 160-bit message.

An exemplary embodiment may be implemented in hardware, software, or a combination thereof. Performance of implementations at least partially comprising hardware may depend on available hardware technology as well as chip space available for locating necessary circuits. Performance of implementations at least partially comprising software may depend upon several factors such as hardware platform, selected compiler, selected programming language, and programming style, and In the present disclosure, a set of electrical circuits and/or comparable components working together to perform a logical, computational, or other processing operation may be referred to as a logical construct ("construct").

Whether implemented in hardware or software, hashing algorithms can generally be broken down into three components. The first component is responsible for receiving the data to be processed, the second block is responsible for processing the data, and the third block is responsible for storing final values.

An exemplary embodiment focuses on optimization of the first and second blocks. There are 2 factors effecting the first block: the interface data width "width" (ie. 32-bits, 64-bits, etc.) for incoming data, which affects the engine (for sixteen cycles, eight cycles, etc., respectively) and the equation of the first block. For skipping multiple cycles, an exemplary embodiment provides for a change in the interface data width. For example, to reduce the number of cycles from eighty cycles to forty cycles when generating a 160-bit message digest, one cycle must be skipped per iteration. Therefore the second block must be provided with an additional 32-bit value every cycle resulting in a transfer rate of 64-bits per cycle from the first block to the second block. If the system is limited to a 32-bit interface and the second block processes data with a width of greater than 32-bits (64-bits for example), the second block waits until it receives sufficient 32-bit values for processing the data.

Observation of existing algorithms also reveals the inclusion of cycles where data is located but not utilized for processing. An exemplary embodiment provides for reducing the total number of cycles necessary to process data during the second block by skipping steps comprising data locating. Specifically, the equations of a cycle are valued in terms of a previous cycle. For example, to reduce the number of cycles required to generate a 160-bit message digest from eighty to forty, the equations at time t are valued in terms of t−2. While the present describes algorithms having first, second, and third blocks or stages, it is understood that an algorithm may include more or less blocks or blocks having similar or non-similar functionality without exceeding the scope of this disclosure.

In one embodiment, the disclosed hashing algorithm is related to United States National Institute of Standards and Technology's ("NIST") Federal Information Processing Standards ("FIPS") Publication 186-2: Digital Signature Standard ("DSS"), Jan. 27, 2000. DSS requires hashing algorithms for use with DSS to be implemented in accordance with the Secure Hash Standard ("SHS"), as defined in NIST FIPS Publication 180-1: Secure Hash Standard, Apr. 17, 1995, which specifies the Secure Hashing Algorithm ("SHA-1"). For this particular embodiment, the C/C++ programming language was selected for implementing an exemplary software embodiment.

Similar to SHS/SHA-1, the system of an exemplary embodiment calls for the generation of a 160-bit message digest and comprises two steps: 1) padding a message such that the message's bit length is adjusted to be a multiple of 512-bits, and 2) applying the message, in 512-bit blocks, as an input to the hashing algorithm for generating a 160-bit message digest.

Padding

An input message is received and is padded in accordance with the padding process defined in NIST FIPS Pub. 180-1. NIST FIPS Pub. 180-1 defines padding and the padding process as follows.

The purpose of message padding is to make the total length of a padded message a multiple of 512. The SHA-1 sequentially processes blocks of 512 bits when computing the message digest. The following specifies how this padding shall be performed. As a summary, a "1" followed by m "0"s followed by a 64-bit integer are appended to the end of the message to produce a padded message of length 512*n. The 64-bit integer is 1, the length of the original message. The padded message is then processed by the SHA-1 as n 512-bit blocks. Suppose a message has length $1<2^{64}$. Before it is input to the SHA-1, the message is padded on the right as follows:

a.) "1" is appended.
Example: if the original message is "01010000", this is padded to "010100001".

b.) "0"s are appended. The number of "0"s will depend on the original length of the message. The last 64 bits of the last 512-bit block are reserved for the length L of the original message.
Example: Suppose the original message is the bit string
01100001 01100010 01100011 01100100 01100101.
After step (a) this gives 01100001 01100010 01100011 01100100 01100101 1. Since L=40, the number of bits in the above is 41 and 407 "0"s are appended, making the total now 448. This gives (in hex) 61626364 65800000 00000000 00000000 00000000 00000000 00000000 00000000 00000000 00000000 00000000 00000000.

c.) Obtain the 2-word representation of L, the number of bits in the original message.

If $L<2^{32}$ then the first word is all zeroes. Append these two words to the padded message.
Example: Suppose the original message is as in (b). Then L=40 (note that 1 is computed before any padding).
The two-word representation of 40 is hex 00000000 00000028. Hence the final padded message is hex 61626364 65800000 00000000 00000000 00000000 00000000 00000000 00000000 00000000 00000000 00000000 00000000 00000000 00000000 00000028.

The padded message will contain 16*n words for some n>0. The padded message is regarded as a sequence of n blocks $M_1, M_2, \ldots, M_n$, where each $M_i$ contains 16 words and $M_1$ contains the first characters (or bits) of the message.

Message Digest Generation:

An exemplary embodiment comprises an efficient hashing algorithm for generating a message digest. For purposes of explanation and comparison only, the hashing algorithm SHA-1, which requires eighty computational cycles to process a 512-bit block and generate a message digest, is now reviewed. NIST FIPS Pub. 180-1, describes the generation of the message digest using the SHA-1 hashing algorithm as follows:

A sequence of logical functions $f_0, f_1, \ldots, f_{79}$ is used in the SHA-1. Each $f_t$, $0<=t<=79$, operates on three 32-bit words B, C, D and produces a 32-bit word as output. $f_t(B,C,D)$ is defined as follows:
for words B, C, D,
$f_t(B,C,D)=(B$ AND $C)$ OR $((NOT B)$ AND $D)$ $(0<=t<=19)$
$f_t(B,C,D)=B$ XOR $C$ XOR $D (20<=t<=39)$
$f_t(B,C,D)=(B$ AND $C)$ OR $(B$ AND $D)$ OR $(C$ AND $D)$ $(40<=t<=59)$
$f_t(B,C,D)=B$ XOR $C$ XOR $D (60<=t<=79)$.

A sequence of constant words $K(0), K(1), \ldots, K(79)$ is used in the SHA-1.
In hex these are given by
$K_t=5A827999$ $(0<=t<=19)$
$K_t=6ED9EBA1$ $(20<=t<=39)$
$K_t=8F1BBCDC$ $(40<=t<=59)$
$K_t=CA62C1D6$ $(60<=t<=79)$.

The message digest is computed using the final padded message. The computation uses two buffers, each consisting of five 32-bit words, and a sequence of eighty 32-bit words. The words of the first 5-word buffer are labeled A,B,C,D,E. The words of the second 5-word buffer are labeled $H_0, H_1, H_2, H_3, H_4$. The words of the 80-word sequence are labeled $W_0, W_1, \ldots, W_{79}$. A single word buffer TEMP is also employed.

To generate the message digest, the 16-word blocks $M_1, M_2, \ldots, M_n$ defined in Section 4 are processed in order. The processing of each $M_i$ involves 80 steps.

Before processing any blocks, the $\{H_i\}$ are initialized as follows: in hex,
$H_0=67452301$
$H_1=EFCDAB89$
$H_2=98BADCFE$
$H_3=10325476$
$H_4=C3D2E1F0$.

Now $M_1, M_2, \ldots, M_n$ are processed. To process $M_i$, we proceed as follows:

a.) Divide $M_i$ into 16 words $W_0, W_1, \ldots W_{15}$, where $W_0$ is the left-most word.

b.) For t=16 to 79 let $W_t=S_1(W_{t-3}$ XOR $W_{t-8}$ XOR $W_{t-14}$ XOR $W_{t-16})$.

c.) Let $A=H_0$, $B=H_1$, $C=H_2$, $D=H_3$, $E=H_4$.

d.) For t=0 to 79 do $TEMP = S^5(A) + f_t(B,C,D) + E + W_t + K_t;$
$E = D; D = C; C = S^{30}(B); B = A; A = TEMP;$ e.) Let $H_0 = H_0 + A$, $H_1 = H_1 + B$, $H_2 = H_2 + C$, $H_3 = H_3 + D$, $H_4 = H_4 + E$.

After processing $M_n$, the message digest is the 160-bit string represented by the 5 words $H_0$ $H_1$ $H_2$ $H_3$ $H_4$.

Table 1 includes intermediate values and the final generated message digest where the original FIPS 180-1 algorithm has been applied to a sample message. As shown in Table 1, eighty cycles are required for the generation of the message digest:

TABLE 1

| | A | B | C | D | E |
|---|---|---|---|---|---|
| t = 00: | 0116FC33 | 67452301 | 7BF36AE2 | 98BADCFE | 10325476 |
| t = 01: | 8990536D | 0116FC33 | 59D148C0 | 7BF36AE2 | 98BADCFE |
| t = 02: | A1390F08 | 8990536D | C045BF0C | 59D148C0 | 7BF36AE2 |
| t = 03: | CDD8E11B | A1390F08 | 626414DB | C045BF0C | 59D148C0 |
| t = 04: | CFD499DE | CDD8E11B | 284E43C2 | 626414DB | C045BF0C |
| t = 05: | 3FC7CA40 | CFD499DE | F3763846 | 284E43C2 | 626414DB |
| t = 06: | 993E30C1 | 3FC7CA40 | B3F52677 | F3763846 | 284E43C2 |
| t = 07: | 9E8C07D4 | 993E30C1 | 0FF1F290 | B3F52677 | F3763846 |
| t = 08: | 4B6AE328 | 9E8007D4 | 664F8C30 | 0FF1F290 | B3F52677 |
| t = 09: | 8351F929 | 4B6AE328 | 27A301F5 | 664F8C30 | 0FF1F290 |
| t = 10: | FBDA9E89 | 8351F929 | 12DAB8CA | 27A301F5 | 664F8C30 |
| t = 11: | 63188FE4 | FBDA9E89 | 60D47E4A | 12DAB8CA | 27A301F5 |
| t = 12: | 4607B664 | 63188FE4 | 7EF6A7A2 | 60D47E4A | 12DAB8CA |
| t = 13: | 9128F695 | 4607B664 | 18C623F9 | 7EF6A7A2 | 60D47E4A |
| t = 14: | 196BEE77 | 9128F695 | 1181ED99 | 18C623F9 | 7EF6A7A2 |
| t = 15: | 20BDD62F | 196BEE77 | 644A3DA5 | 1181ED99 | 18C623F9 |
| t = 16: | 4E925823 | 20BDD62F | C65AFB9D | 644A3DA5 | 1181ED99 |
| t = 17: | 82AA6728 | 4E925823 | C82F758B | C65AFB9D | 644A3DA5 |
| t = 18: | DC64901D | 82AA6728 | D3A49608 | C82F758B | C65AFB9D |
| t = 19: | FD9E1D7D | DC64901D | 20AA99CA | D3A49608 | C82F758B |
| t = 20: | 1A37B0CA | FD9E1D7D | 77192407 | 20AA99CA | D3A49608 |
| t = 21: | 33A23BFC | 1A37B0CA | 7F67875F | 77192407 | 20AA99CA |
| t = 22: | 21283486 | 33A23BFC | 868DEC32 | 7F67875F | 77192407 |
| t = 23: | D541F12D | 21283486 | 0CE88EFF | 868DEC32 | 7F67875F |
| t = 24: | C7567DC6 | D541F12D | 884A0D21 | 0CE88EFF | 868DEC32 |
| t = 25: | 48413BA4 | C7567DC6 | 75507C4B | 884A0D21 | 0CEBBEFF |
| t = 26: | BE35FBD5 | 48413BA4 | B1D59F71 | 75507C4B | 884A0D21 |
| t = 27: | 4AA84D97 | BE35FBD5 | 12104EE9 | B1D59F71 | 75507C4B |
| t = 28: | 8370B52E | 4AA84D97 | 6F8D7EF5 | 12104EE9 | B1D59F71 |
| t = 29: | C5FBAF5D | 8370252E | D2AA1365 | 6FSD7EF5 | 12104EE9 |
| t = 30: | 1267B407 | C5FBAF5D | A0DC2D4E | D2AA1365 | 6F8D7EF5 |
| t = 31: | 3E845D33 | 1267B407 | 717EEBD7 | A0DC2D4B | D2AA1365 |
| t = 32: | 046FAA0A | 3B845D33 | C499ED01 | 717EEBD7 | A0DC2D4B |
| t = 33: | 2C0EBC11 | 04GFAA0A | CEE1174C | C499ED01 | 717EEBD7 |
| t = 34: | 21796AD4 | 200EBC11 | 811BEA82 | CEE1174C | C499ED01 |
| t = 35: | DCBBB0CB | 21796AD4 | 4B03AF04 | 811BEA82 | CEE1174C |
| t = 36: | 0F511FD8 | DCBBB0CB | 085E5A25 | 4B03AF04 | S11BEA82 |
| t = 37: | DC63973F | 0F511FD8 | F72EEC32 | 085E5AB5 | 4B03AF04 |
| t = 38: | 4C986405 | DC63973F | 03D447F6 | F72EEC32 | 085E5AB5 |
| t = 39: | 32DE1CBA | 4C986405 | F718E5CF | 03D44W6 | F72EEC32 |
| t = 40: | FC87DEDF | 32DE1CBA | 53261901 | F71BE5CF | 03D447F6 |
| t = 41: | 970A0D5C | FCS7DEDF | 8CB7872E | 53261901 | F718E5CF |
| t = 42: | 7F193DC5 | 970A0D5C | FF21F7B7 | 8CB7872E | 53261901 |
| t = 43: | EE1B1AAF | 7F193DC5 | 25C28357 | FF21F7B7 | 8CB7872E |
| t = 44: | 40F28E09 | EE1B1AAF | 5FC64F71 | 25C28357 | FF21F7B7 |
| t = 45: | 1C51E1F2 | 40F28E09 | FB86C6AB | 5FC64F71 | 25C28357 |
| t = 46: | A01B846C | 1C51E1F2 | 503CA382 | FB86C6AB | 5FC64F71 |
| t = 47: | BEAD02CA | A01B846C | 8714787C | 503CA382 | FB86C6AB |
| t = 48: | BAF39337 | BEAD02CA | 2806E11B | 8714787C | 503CA382 |
| t = 49: | 120731C5 | BAF39337 | AFAB40B2 | 2806E11B | 8714787C |
| t = 50: | 641DB2CE | 120731C5 | EEBCE4CD | AFAB40B2 | 2806E11B |
| t = 51: | 3847AD66 | 641DB2CE | 4481CC71 | EEBCE4CD | AFAB40B2 |
| t = 52: | E490436D | 3847AD66 | 99076CB3 | 4481CC71 | EEBCE4CD |
| t = 53: | 27E9F1D8 | E490436D | 8E11EB59 | 99076CP3 | 4481CC71 |
| t = 54: | 7B71F76D | 27E9F1D8 | 792410DB | 8E11EB89 | 99076CB3 |
| t = 55: | 5E6456AF | 7B71F76D | 09FA7C76 | 792410DB | 8E11E259 |
| t = 56: | C846093F | 5E6456AF | 5EDC7DDB | 09FA7C76 | 792410DB |
| t = 57: | D262FF50 | C846093F | D79915AB | 5EDC7DDB | 09FA7C76 |
| t = 58: | 09D785FD | D262FF50 | F211824F | D79915AB | 5EDC7DDB |
| t = 59: | 3F52DE5A | 09D785FD | 3498BFD4 | F211824F | D79915AB |
| t = 60: | D756C147 | 3F52DE5A | 4275E17F | 3498BFD4 | F211824F |
| t = 61: | 548C9CB2 | D756C147 | 8FD4B796 | 4275E17F | 3498BFD4 |
| t = 62: | B66C020B | 548C9CB2 | F5D5B051 | 8FD42796 | 4275E17F |
| t = 63: | 6B61C9E1 | 266C0202 | 9523272C | F5D5B051 | 8FD45796 |
| t = 64: | 19DFA7AC | 6B61C9E1 | ED9B0082 | 9523272C | F5D5B051 |
| t = 65: | 101655F9 | 19DFA7AC | 5AD87278 | ED9B0082 | 9523272C |
| t = 66: | 0C3DF2B4 | 101655F9 | 0677E9EB | 5AD87278 | ED9B0082 |
| t = 67: | 78DD4D2B | 0C3DF2B4 | 4405957E | 0677E9EB | 5AD87278 |

TABLE 1-continued

| | | | | |
|---|---|---|---|---|
| t = 68: | 497093C0 | 78DD4D2B | 030F7CAD | 4405957E | 0677E9EB |
| t = 69: | 3F2588C2 | 497093C0 | DE37534A | 030F7CAD | 4405957E |
| t = 70: | C199F8C7 | 3F2588C2 | 125C24F0 | DE37534A | 030F7CAD |
| t = 71: | 39859DE7 | C199F8C7 | 3FC96230 | 125C24F0 | DE37534A |
| t = 72: | EDB42DE4 | 39859DE7 | F0667E31 | 8FC96230 | 125C24F0 |
| t = 73: | 11793F6F | EDB42DE4 | CE616779 | F0667E31 | 8FC96230 |
| t = 74: | 5EE76897 | 11793F6F | 3B6D0B79 | CE616779 | F0667E31 |
| t = 75: | 63F7DAB7 | 5EE76897 | C45E4FDB | 3B6D0B79 | CE616779 |
| t = 76: | A079B7D9 | 63F7DAB7 | D7B9DA25 | C45E4FDB | 3B6D0B79 |
| t = 77: | 860D21CC | A07927D9 | D8FDF6AD | D7B9DA25 | C45E4FDB |
| t = 78: | 5738D5E1 | 860D21CC | 681E6DF6 | D8FDF6AD | D7B9DA25 |
| t = 79: | 42541B35 | 5738D5E1 | 21834873 | 681E6DF6 | D8FDF6AD. |

Block 1 has been processed. The values of {Hi} are
$H_0$ = 67452301 + 42541B35 = A9993E36
$H_1$ = EFCDAB89 + 5738D5E1 = 4706816A
$H_2$ = 98BADCFE + 21834873 = BA3E2571
$H_3$ = 10325476 + 681E6DF6 = 7850C26C
$H_4$ = C3D2E1F0 + D8FDF6AD = 9CD0D89D
Message digest=A9993E36 4706816A BA3E2571 7850C26C 9CD0D89D An exemplary embodiment of the invention comprises a message digest algorithm that reduces the required number of computational cycles by fifty percent or more compared to the original SHA-1 algorithm. Moreover, the number of required computational cycles is further reduced where the algorithm is iteratively repeated, e.g., the original SHA-1 is eighty cycles, after applying the method the first time the number of cycles is reduced to forty, after applying the method two times the number of cycles is reduced to twenty then to sixteen and so forth. The following summary is a partial list of possible reductions in computational cycles for each of a given number of cycles skipped per iteration:

| cycles skipped (per iteration) | total computational cycles |
|---|---|
| 0 | 80 |
| 1 | 40 |
| 3 | 20 |
| 4 | 16 |
| 7 | 10 |
| 9 | 8 |
| 15 | 5 |
| 19 | 4 |
| 39 | 2 |

While an exemplary embodiment comprises the message generation algorithm described below, it is understood that the message digest generation algorithm may be varied without exceeding the scope of this disclosure. The following is the message generation algorithm for an exemplary embodiment:

a.) If the data block is less than 512-bit it should be padded as previously described under padding.
b.) Divide a 512-bit message M into 8 64-bit words W[0], . . ., W[8] where W[0] is the leftmost word.
c.) Let A = H0, B = H1, C = H2, D = H3, E = H4;
d.) For (t =0; t= 39; t++) do
    S = T AND MASK (MASK = 0x00000007)
    if(t >= 8) then W[t] = shift1bitsleft( W[(t + 6) AND MASK] XOR
        W[(t + 3) AND MASK] XOR W[(t + 1) AND MASK] XOR
        W[(t + 0)]);
End if;
When (0 <= t <= 9) then
    ft (B,C,D) = (B AND C) OR (NOT(B) AND D);
    ft (A,B,C) = (A AND B) OR (NOT(A) ANT) C);
Else When (10 <= t <= 19) then
    ft (B,C,D) = (B XOR C XOR D);
    ft (A,B,C) = (A XORB XOR C);
Else When (20 <= t <= 29) then
    ft (B,C,D) = (B AND C) OR (B AND D) OR (C AND D);
    ft (A,B,C) = (A AND B) OR (A AND C) OR (B AND C);
Else When (30 <= t <= 39) then
    ft (B,C,D) (B XOR C XOR D);
    ft (A,B,C) = (A XOR B XOR C);

```
        End When;
        TEMP = shift5bitsleft(A) + ft (B,C,D) + E + W[s] + Kt;
        E = D; D = C; C = shift30bitsleft(B); B = A; A = TEMP;
    End for loop;
e.) Let H0 = H0 + A; H1 = H1 + B; H2 = H2 + C; H3 = H3 + D; H4 = H4 + E;
```

There are two factors that affect the block: the interface data width for the incoming data which affects the engine for eight cycles. The other factor that affects the remaining sixty four cycles is the internal equation of the block. For skipping multiple cycles the equation changes and the only change is the width of the W operand. The width is related to the number of cycles we want to skip. For example if we want to go from 80 cycles to 40 cycles we are skipping one cycle per iteration. This means we need to provide the second block with an additional 32-bit value every cycle. An exemplary embodiment provides for the following first block equation for processing 64-bits of data at a time instead of the 32-bits of data processed at a time for the original SHA equation:

$$W_t = S^1(W_t \text{ XOR } W_{t+1} \text{ XOR } W_{t+3} \text{ XOR } W_{t+6}),$$

where t is the cycle we are currently in, $S^1$ equals the value circularly rotated left by one bit, and $W_t$ is the value transmitted to the second block for processing.

The second block is updated every cycle and at the end of processing the 512-bit block. The second block equations of the original SHA equations at time t in terms of t−1 are as follows:

$$E(t) = D(t-1)$$

$$D(t) = C(t-1)$$

$$C(t) = S30[B(t-1)]$$

$$B(t) = A(t-1)$$

$$A(t) = S5(A(t-1)) + ft(B(t-1), C(t-1), D(t-1)) + E(t-1) + Wt + Kt$$

In evaluating the preceding equations, it is observable that only the determination of A(t) requires a complex calculation. The second block equations for the original SHA equations at time t−1 in terms of t−2 are as follows:

$$E(t-1) = D(t-2)$$

$$D(t-1) = C(t-2)$$

$$C(t-1) = S30[B(t-2)]$$

$$B(t-1) = A(t-2)$$

$$A(t-1) = S5(A(t-2)) + ft(B(t-2), C(t-2), D(t-2)) + E(t-2) + Wt-1 + Kt-1$$

Once again, it is observable that only the determination of A(t−1) requires a complex calculation. An exemplary embodiment provides for a reduction in the number of cycles necessary for the second block. This may be accomplished, for example, by substituting the values in first equation set with the values in second equation set resulting in the following modified equations:

$$E(t) = C(t-2)$$

$$D(t) = S30[B(t-2)]$$

$$C(t) = S30[A(t-2)]$$

$$B(t) = S5(A(t-2)) + ft(B(t-2), C(t-2), D(t-2)) + E(t-2) + Wt-1 + Kt-1$$

$$A(t) = S5(S5(A(t-2)) + ft(B(t-2), C(t-2), D(t-2)) + E(t-2) + Wt-1 + Kt-1) + ft(A(t-2), S30[B(t-2)], C(t-2)) + D(t-2) + Wt + Kt =$$

$$S5(B(t)) + ft(A(t-2), S30[B(t-2)], C(t-2)) + D(t-2) + Wt + Kt$$

This procedure can be repeated to achieve greater reductions of cycles by calculating values at time t in terms of the values at t−3, t−4, t−5, etc., without exceeding the scope of the present disclosure.

The third block is updated at the end of processing a 512-bits of data. If the processing requires 80 cycles, the third block is updated every 80 cycles. If we skip one step the total number of cycles becomes 40 which mean the third block is updated every 40 cycles. Thus, the third block remains the same regardless of the number of cycles we skip. The only difference is that it is updated at different times related to the number of cycles we skip.

Table 2 includes intermediate values and the final generated message digest where the described algorithm has been applied to the same sample message the previously described FIPS 180-1 algorithm was applied to. As shown in Table 2, forty cycles are used for the generation of the message digest compared to the eighty cycles that were required for message digest generation when using the FIPS 180-1 algorithm:

TABLE 2

| | A | B | C | D | E |
|---|---|---|---|---|---|
| t = 00: | 8990536D | 0116FC33 | 59D148C0 | 7BF3GAE2 | 98BADCFE |
| t = 01: | CDD8E11B | A1390F08 | 626414DB | C045BF0C | 59D148C0 |
| t = 02: | 3FC7CA40 | CFD499DE | F3763846 | 284E43C2 | 626414DB |
| t = 03: | 9E8C07D4 | 993E30C1 | 0FF1F290 | B3F52677 | F3763846 |
| t = 04: | 8351F929 | 4B6AE328 | 27A301F5 | 664F8C30 | 0FF1F290 |
| t = 05: | 63188FE4 | FBDA9E89 | 60D47E4A | 12DAB8CA | 27A301F5 |
| t = 06: | 9128F695 | 4607B664 | 18C623F9 | 7EF6A7A2 | 60D47E4A |
| t = 07: | 20BDDG2F | 196BEE77 | 644A3DA5 | 1181ED99 | 18C623F9 |
| t = 08: | 82AA6728 | 4E925823 | C82F7582 | C65AFB9D | 644A3DA5 |
| t = 09: | FD9E1D7D | DC64901D | 20AA99CA | D3A49608 | C82F758B |
| t = 10: | 33A23BFC | 1A37B0CA | 7F67875F | 77192407 | 20AA99CA |
| t = 11: | D541F12D | 21283486 | 0CE88EFF | 868DEC32 | 7F67875F |
| t = 12: | 48413BA4 | C7567DC6 | 75507C4B | 884A0D21 | 0CE88EFF |
| t = 13: | 4AA84D97 | BE35FBD5 | 12104EE9 | B1D59F71 | 75507C4B |
| t = 14: | C5FBAF5D | 8370B52E | D2AA1365 | GF8D7EF5 | 12104EE9 |
| t = 15: | 3B845D33 | 1267B407 | 717EEBD7 | A0DC2D4B | D2AA1365 |
| t = 16: | 2C0EBC11 | 046FAA0A | CEE1174C | C499ED01 | 717EEBD7 |
| t = 17: | DCBBB0CB | 21796AD4 | 4B03AF04 | 811BEA82 | CEE1174C |
| t = 18: | DC63973F | 0F511FD8 | F72EEC32 | 085E5AB5 | 4B03AF04 |
| t = 19: | 32DE1CBA | 4C986405 | F718E5CF | 03D447F6 | F72EEC32 |
| t = 20: | 970A0D5C | FC87DEDF | 8CB7872E | 53261901 | F718E5CF |
| t = 21: | EE1B1AAF | 7F193DC5 | 25C28357 | FF21F7B7 | 8CB7872E |
| t = 22: | 1C51E1F2 | 40F28E09 | FB86CGAB | 5FC64F71 | 25C28357 |
| t = 23: | BEAD02CA | A01B84GC | 8714787C | 503CA382 | FB86C6AB |
| t = 24: | 120731C5 | BAF39337 | APAB40B2 | 2806E11B | 8714787C |
| t = 25: | 3847AD66 | G41DB2CE | 4481CC71 | EEBCE4CD | AFAB40B2 |
| t = 26: | 27E9F1D8 | E490436D | 8E11EB59 | 99076CB3 | 4481CC71 |
| t = 27: | 5E6456AF | 7B71F76D | 09FA7C76 | 792410DB | 8E11EB59 |
| t = 28: | D262FF50 | C846093F | D79915AB | 5EDC7DDB | 09FA7C76 |
| t = 29: | 3F52DE5A | 09D785FD | 3498BFD4 | F211824F | D79915AB |
| t = 30: | 548C9CB2 | D756C147 | 8FD4B796 | 4275E17F | 3498BFD4 |
| t = 31: | 6B61C9E1 | B6GC020B | 9523272C | F5D5B051 | 8FD4B796 |
| t = 32: | 101655F9 | 19DFA7AC | 5AD87278 | ED9B0082 | 9523272C |
| t = 33: | 78DD4D2B | 0C3DF2B4 | 4405957E | 0677E9EB | 5AD87278 |
| t = 34: | 3F2588C2 | 497093C0 | DE37534A | 030F7CAD | 4405957E |
| t = 35: | 39859DE7 | C199F8C7 | 8FC96230 | 125C24F0 | DE37534A |
| t = 36: | 11793F6F | EDB42DE4 | CE616779 | F0667E31 | 8FC96230 |
| t = 37: | 63F7DA27 | 5EE76897 | C45E4FDB | 3B6D0B79 | CE616779 |
| t = 38: | 860D21CC | A07927D9 | D8FDFGAD | D7B9DA25 | C45E4FDB |
| t = 39: | 42541B35 | 5738D5E1 | 21834873 | 681E6DF6 | D8FDF6AD |

Block 1 has been processed. The values of {Hi} are
$H_0$ = 67452301 + 42541B35 = A9993E36
$H_1$ = EFCDAB89 + 5738D5E1 = 4706816A
$H_2$ = 98BADCFE + 21834873 = BA3E2571
$H_3$ = 10325476 + 681E6DF6 = 7850C26C
$H_4$ = C3D2E1F0 + D8FDF6AD = 9CD0D89D
Messagedigest=A9993E36 4706816A BA3E2571 7850C26C 9CD0D89D Hardware Implementation As discussed earlier, an exemplary embodiment provides for both software and hardware implementations. It is understood that the message digest generation algorithm may be implemented using any hardware technology know to one of ordinary skill in the art and that use of alternative hardware technologies does not exceed the scope of the present disclosure. Moreover, it is understood that the message digest generation algorithm may be implemented using any combination of constructs known to one of ordinary skill in the art, including registers, adders, multiplexors (MUX), AND gates, OR gates, and XOR gates, and thus such a hardware implementation is not limited to the exemplary hardware implementation disclosed herein. For the purposes of this disclosure, when referring directly to a register or other construct, it is understood to be a reference to a value contained therein where the context of the reference dictates such.

To avoid excessive computational overhead and reduced efficiency, the number of cycles to be skipped during a given iteration should be a combination of the factors of eighty, where the remainder is zero minus one, such as 1, 3, 4, 7, 9, 15, 19, and 39. Skipping steps is successful where the number of steps skipped X satisfies the equation Y−[(80/(x+1))−1] where Y comprises fractional and integer parts, and further where the integer part indicates the number of cycles required for processing the block. X represents the number of steps skipped. If the fractional part is not equal to zero, excessive overhead is introduced.

Figure 2:
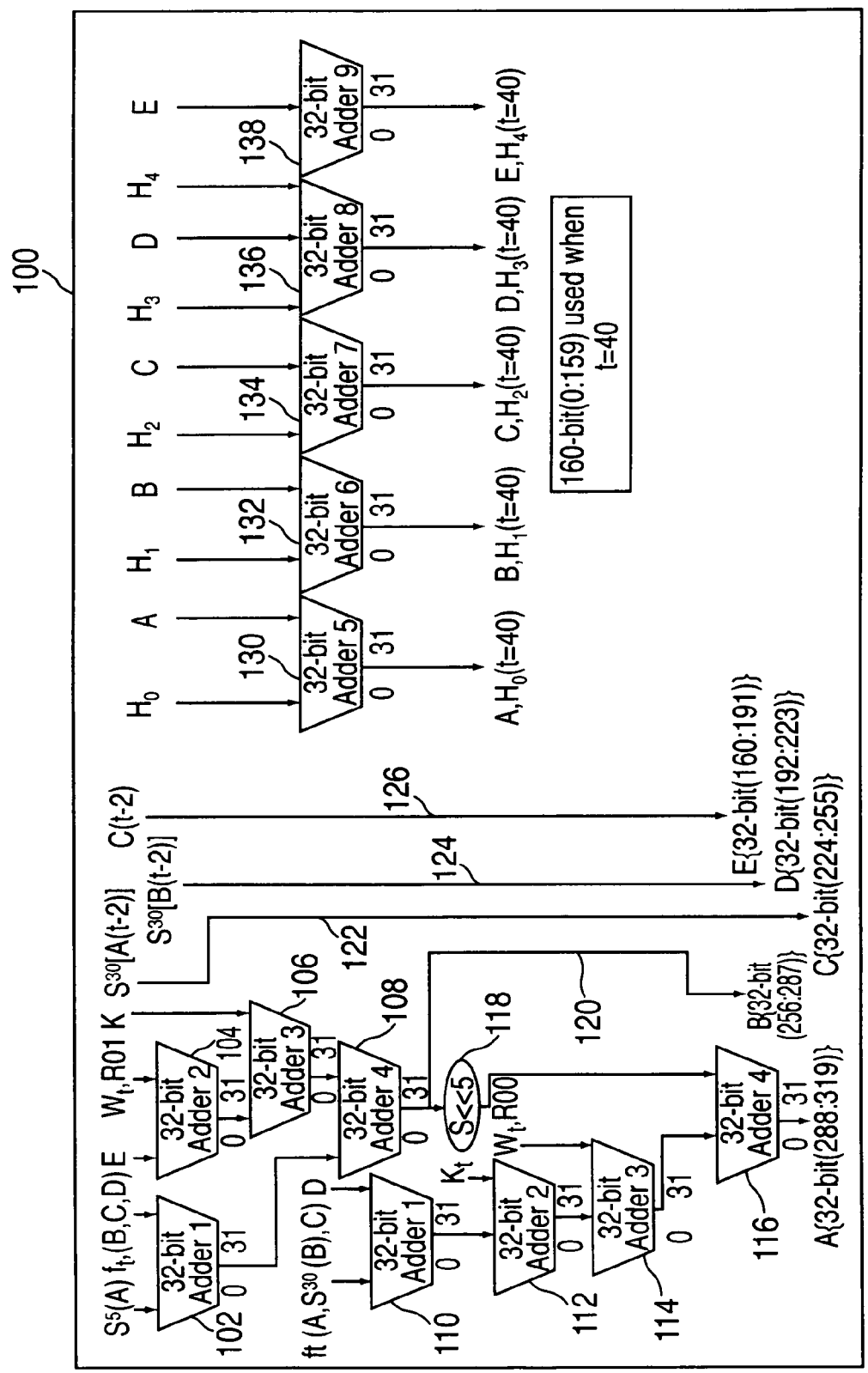
FIG. 2 is a detailed diagram of the adder structure shown in FIG. 1.

A first hardware implementation uses CMOS7SF/CMOS8SF technology having a 7.5 ns cycle time. FIG. 1 shows an exemplary message digest generator 10 built using CMOS7SF/CMOS8SF technology and FIG. 2 is a detailed diagram of adder structure 40 of FIG. 1. Referring to FIG. 1. Registers R00–R17 shown at 12–28 receive a 512 bit message. R00/R01 at 12 receives 64-bit values generated by XORs 30–34 and right shifter 36. Adder structure 40 receives values stored in registers A through E at 42–50, constant values stored in registers 52, the value of $F_t(A,B,C)$ as generated by construct 54, the value of $F_t(B,C,D)$ as generated by construct 56, and values stored in registers $H_0$ through $H_4$ as shown at 58–66. Registers A through E shown at 42–50 and $H_0$ through $H_4$ receive values from adder structure 40. During the final cycle required for generating a message digest, the generated message digest is stored to registers $H_0$ through $H_4$ and also in registers A through E.

Turning now to FIG. 2, wherein t=the current cycle and n=the total number of cycles. For t=0 to t=n−1, the adder structure 100 performs the following. The 5-bit shift of A and $F_t$(B,C,D) are applied as input to adder 102. E and $W_t$,R01 are applied as input to adder 104. The output of adder 104 and K are applied as input to adder 106. The output of adder 102 and adder 106 are applied as input to adder 108. The output of adder 108 is stored to register B at 44. $F_t$(A,S30(B),C) and D are applied as input to adder 110. The output of adder 110 and $K_t$ are applied as input to adder 112. The output of adder 112 is applied along with $W_t$ and R00 as input to adder 114. The output of adder 114 and the shift left 5 bits 118 of the output of adder 108 are applied as inputs to adder 116. The output of adder 116 is stored to register A at 42. The 30-bit shift of A(t−2) at 122 is stored to register C at 46. The 30-bit shift of B(t−2) at 124 is stored to register D at 48. C(t−2) at 126 is stored to register E at 50.

For t=n the adder structure 100 performs the following. Registers $H_0$ at 58 and A at 42 are applied as input to adder 130. The output of adder 130 is stored back to registers A at 42 and $H_0$ at 58. Registers $H_1$ at 60 and B at 44 are applied as input to adder 132. The output of adder 132 is stored back to registers $H_1$ at 60 and B at 44. Registers $H_2$ at 62 and C at 46 are applied as input to adder 134. The output of adder 134 is stored back to registers $H_2$ at 62 and C at 56. Registers $H_3$ at 64 and D at 48 are applied as input to adder 136. The output of adder 136 is stored back to registers $H_3$ at 64 and D at 48. Registers $H_4$ at 66 and E at 50 are applied as input to adder 138. The output of adder 138 is stored back to registers $H_4$ at 66 and E at 50.

Figure 3:
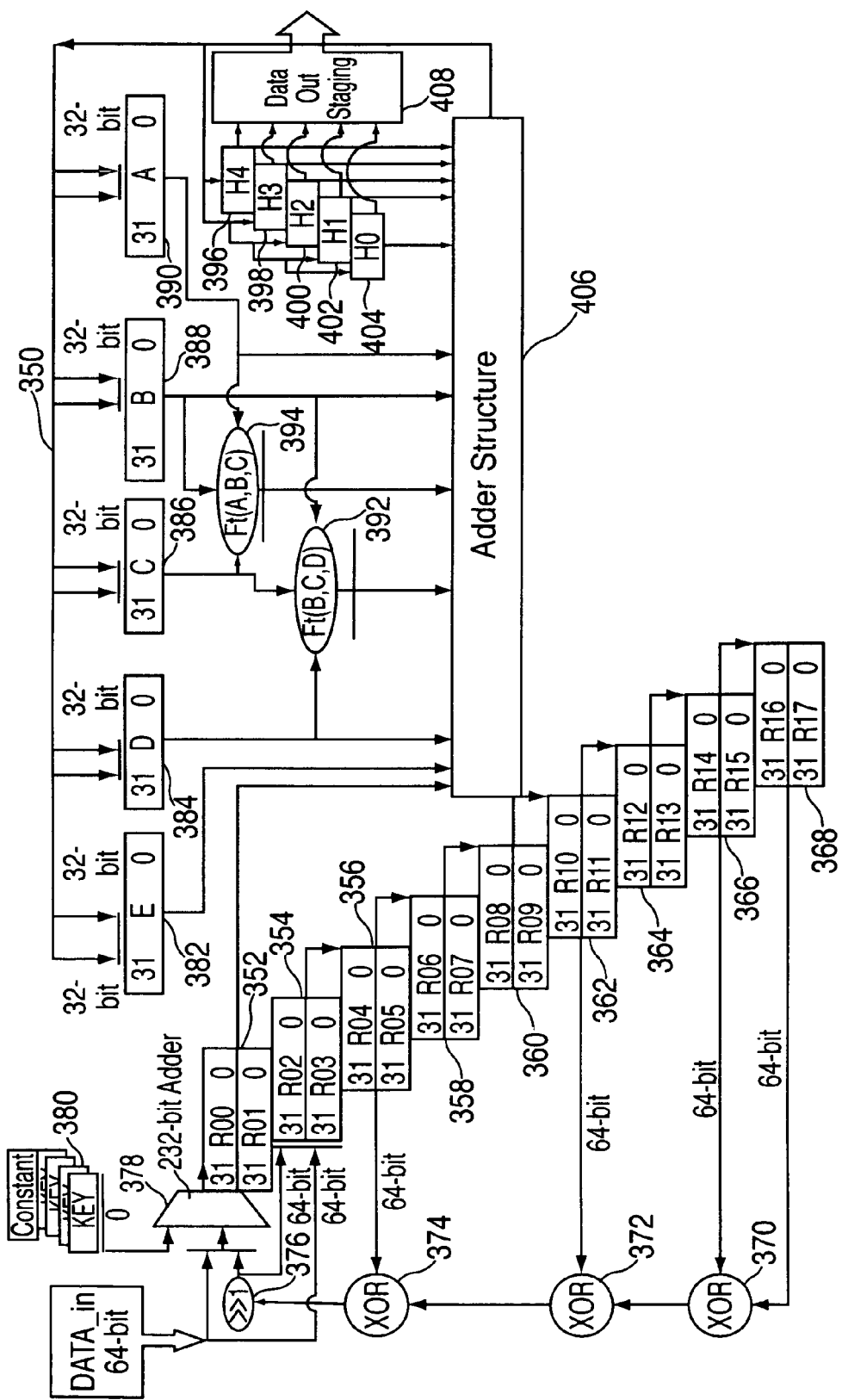
FIG. 3 is a hardware diagram for an alternative implementation of a 160-bit message digest generator requiring at most 41 cycles to generate the 160-bit message.
Figure 4:
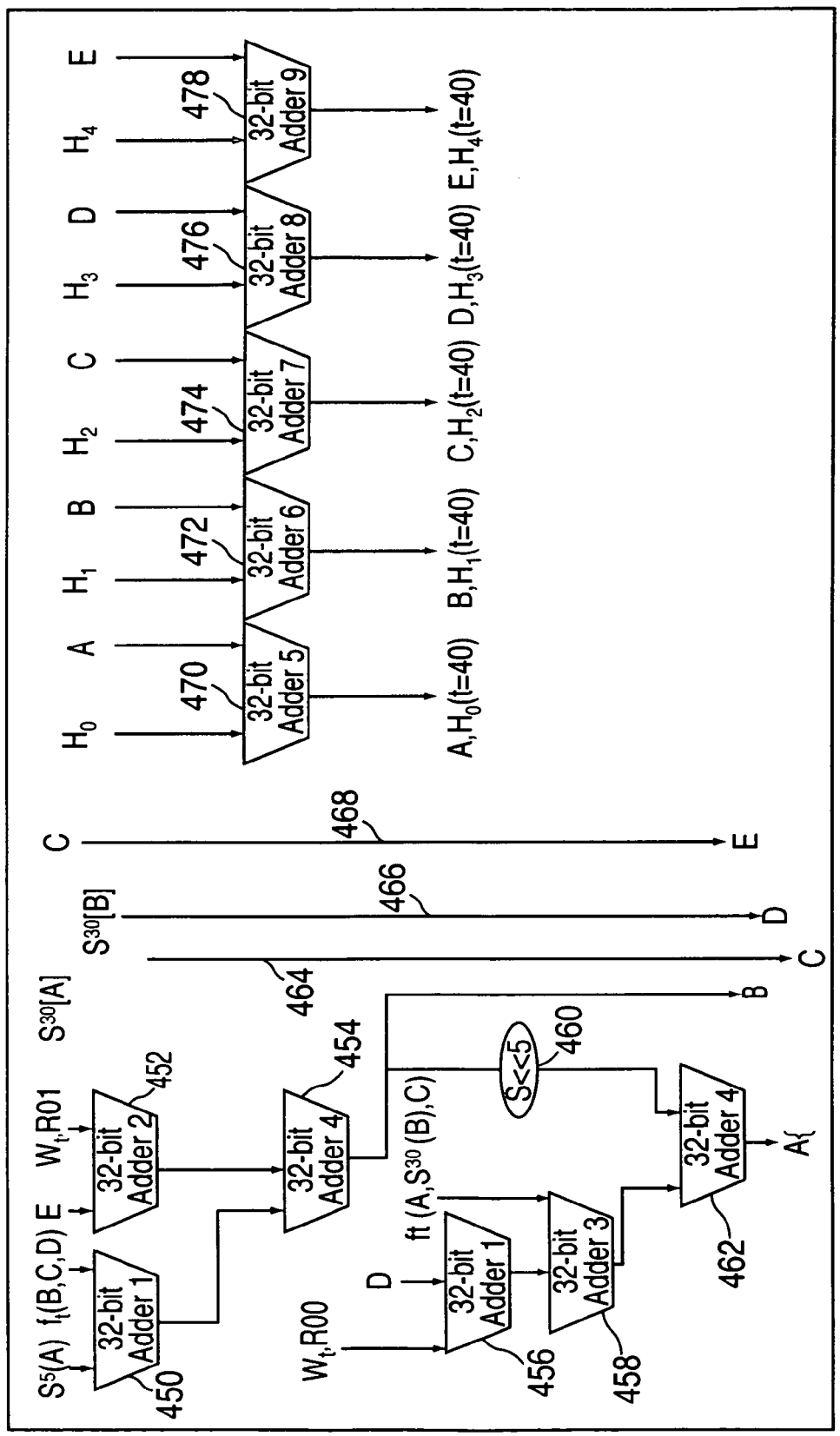
FIG. 4 is a detailed diagram of the adder structure shown in FIG. 3.

FIGS. 3 and 4 show an alternative first hardware implementation also utilizing CMOS7SF/CMOS8SF technology having a 7.5 ns cycle time. Referring to FIG. 3, registers R00 through R17 at 352–368 receive data from adder 378. Adder 378 receives data from constants 380, a data interface, and 1 bit left shifter 376. XOR 370 receives values from R16, R17 at 368 and R14, R15 at 366. XOR 372 receives values from XOR 370 and R10, R11. XOR 374 receives values from XOR 372 and R04, R05 at 356. 1-bit left shifter 376 receives values from XOR 374. R02, R03 at 354 receives values from the data interface and 1 bit left shifter 376. Adder structure 406 receives values from R00, R01 at 352, registers A through E at 382–390, registers H0 through H4 at 396–404, $F_t$(B,C,D) at 392, and $F_t$(A,B,C) at 394. $F_t$(B,C,D) at 392 receives values from registers D at 384, C at 386, and B at 388. $F_t$(A,B,C) at 394 receives values from registers C at 386, B at 388, and A at 390. Registers A through E at 382–390 and registers H0 through H4 at 396–404 receive values from adder structure 406.

FIG. 4 shows the adder structure 406 of FIG. 3, wherein t=the current cycle and n=the total number of cycles. For t=0 to t=n−1, the adder structure 406 performs the following: Adder 450 receives $S^5(A)$ and $F_t$(B,C,D) as inputs. Adder 452 receives E as well as R01 as inputs. The outputs of adder 450 and adder 452 are inputs to adder 454. Adder 456 receives as inputs D as well as R00. Adder 458 receives as inputs the output of adder 456 and $Ft(A,S^{30}(B),C)$. Adder 462 receives as input the output of adder 458 and the 5 bit left shift 460 of the output of adder 454. The output of adder 462 is stored to register A at 390. The output of adder 454 is stored to register B at 388. $S^{30}[A]$ is stored to register C at 386. $S^{30}[B]$ is stored to register D at 384. C is stored to register E at 382.

For t=n the adder structure 406 performs the following. Registers $H_0$ at 404 and A at 390 are applied as input to adder 470. The output of adder 470 is stored back to registers A at 390 and $H_0$ at 404. Registers $H_1$ at 402 and B at 388 are applied as input to adder 472. The output of adder 472 is stored back to registers $H_1$ at 402 and B at 388. Registers $H_2$ at 400 and C at 386 are applied as input to adder 474. The output of adder 474 is stored back to registers $H_2$ at 400 and C at 386. Registers $H_3$ at 398 and D at 384 are applied as input to adder 476. The output of adder 476 is stored back to registers $H_3$ at 398 and D at 384. Registers $H_4$ at 396 and E at 382 are applied as input to adder 478. The output of adder 478 is stored back to registers $H_4$ at 396 and E at 382.

Figure 5:
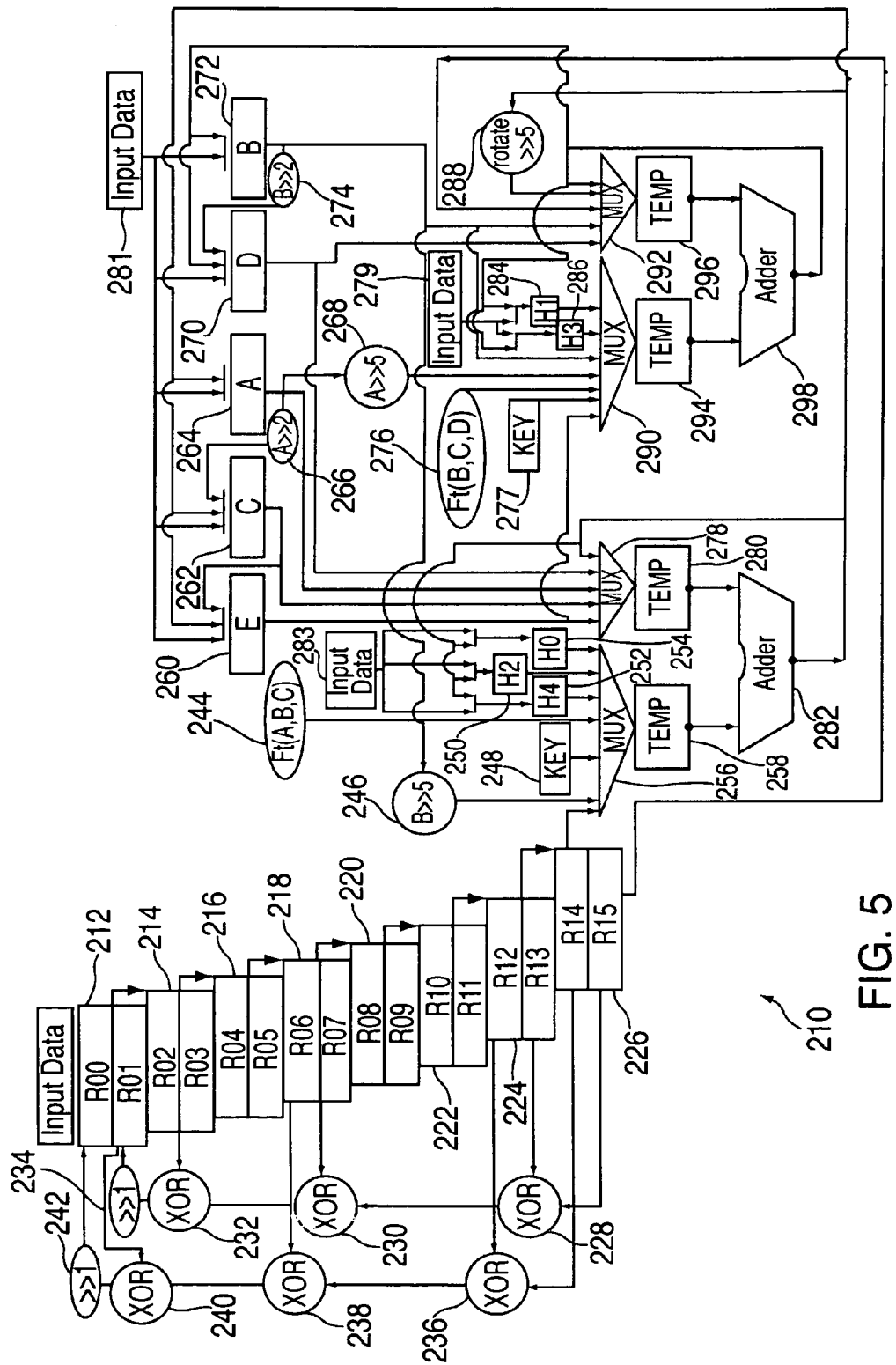
FIG. 5 is a hardware diagram for the implementation of a 160-bit message digest generator requiring at most 205 cycles to generate the 160-bit message.

A second hardware implementation uses SA38 (CMOS9S) technology having a 600 ps cycle time resulting in an overall cycle reduction of fifty percent when compared to the original SHA-1 algorithm implemented using identical technology. FIG. 5 shows message generator 210 built using SA38 technology. Referring to FIG. 5. Registers R00–R15 shown at 212–226 receive a 512 bit message. R00 at 212 receives the 1-bit rightshift 242 of XOR 240. XOR 240 receives R01 at 212 and XOR 238. XOR 238 receives R06 at 218 and XOR 236. XOR 236 receives R12 at 224 and R14 at 226. R01 at 212 receives the 1-bit right shift 234 of XOR 232. XOR 232 receives R02 at 214 and XOR 230. XOR 230 receives R07 at 218 and XOR 228. XOR 228 receives R13 at 224 and R15 at 226.

MUX 256 receives values from R14 at 226, the shift right 5-bits 246 of B 272, KEY 248, ft(A,B,C) 244, KEY 248, H4 at 252, H2 at 250, and H0 at 254. TEMP 258 receives values from MUX 256. MUX 278 receives values from E 260, C 262, A 264, D 270, and adder 282. TEMP 280 receives values from MUX 278. Adder 282 receives values from TEMP 258 and from TEMP 280.

MUX 290 receives values from E 260, KEY 277, ft(B, C,D) 276, the right shift 5 bits 268 of A 264, B 272, H3 at 286, and H1 at 284. TEMP 294 receives values from MUX 290. MUX 292 receives values from D at 270, B at 272, R15 at 226, the rotate right 5-bits 288 of adder 282, and adder 298. Temp 296 receives values from MUX 292. Adder 298 receives values from TEMP 294 and TEMP 296. E at 260 receives values from C at 262, adder 282, and input data 281. C at 262 receives values from input data 281, adder 282, and the right shift 2-bits 266 of A at 264. A at 264 receives values from input data 281 and adder 282. D at 270 receives values from input data 281, adder 298, and the right shift 2-bits 274 of B at 272. B at 272 receives values from input data 281 and adder 298. H4 at 252 receives values from input data 283 and adder 282. H2 at 250 receives values from input data 283 and adder 282. H0 at 254 receives values from input data 283 and adder 282. H3 at 286 receives values from input data 279 and adder 298. H1 at 284 receives values from input data 279 and adder 298.

While the above-described embodiment is related to FIPS 180-1, it is understood that the invention may be implemented in relation to any compatible algorithm known to one of ordinary skill in the art. For example, in an alternative embodiment, an alternative message generation algorithm is provided relating to the known MD5 algorithm. Like the SHA algorithm, the alternative MD5 algorithm operates on 512-bit blocks. However, it generates a 128-bit-message digest. If the text is bigger than 512-bits we divide the text into 512-bit blocks. For purposes of explanation and comparison only, a known MD5 hashing algorithm, which requires 64 computational cycles to process a 512-bit block and generate a message digest, is now reviewed:

a. if the data block is less than 512-bit it should be padded
b. Divide a 512-bit message M into 8 64-bit words W[0], . . ., W[8]
  W[0] is the leftmost word. Transfer them to the engine.
c. Let A = $H_0$, B = $H_1$, C = $H_2$, D = $H_3$;
d. For (t = 0; t= 63; t++)do
  When (t=00,04,08,12) {S = 07};    When (t=01,05,09,13) {S = 12};
  When (t=02,06,10,14) {S = 17};    When (t=03,07,11,15) {S = 22};
  When (t=16,20,24,28) {S = 05};    When (t=17,21,25,29) {S = 09};
  When (t=18,22,26,30) {S = 14};    When (t=19,23,27,31) {S = 20};
  When (t=32,36,40,44) {S = 04};    When (t=33,37,41,45) {S = 11};
  When (t=34,38,42,46) {S = 16};    When (t=35,39,43,47) {S = 23};
  When (t=48,52,56,60) {S = 06};    When (t=49,53,57,61) {S = 10};
  When (t=50,54,58,62) {S = 15};    When (t=51,55,59,63) {S = 21};
  When (t=00,19,41,48) {j = 00};    When (t=01,16,36,55) {j = 01};
  When (t=02,29,47,62) {j = 02};    When (t=03,26,42,53) {j = 03};
  When (t=04,23,37,60) {j = 04};    When (t=05,20,32,51) {j = 05};
  When (t=06,19,43,58) {j = 06};    When (t=07,30,38,49) {j = 07};
  When (t=08,27,33,56) {j = 08};    When (t=09,24,44,63) {j = 09};
  When (t=10,21,39,54) {j = 10};    When (t=11,18,34,61) {j = 11};
  When (t=12,31,45,52) {j = 12};    When (t=13,28,40,59) {j = 13};
  When (t=14,25,35,50) {j = 14};    When (t=15,22,46,57) {j = 15};
  When ( 0 <= t <= 15) {   $f_t$(B,C,D) = (B AND C) OR (NOT(B) AND D);
                           $f_t$(A,B,C) = (A AND B) OR (NOT(A) AND C);
                           $f_t$(D,A,B) = (D AND A) OR (NOT(D) AND B);
                           $f_t$(C,D,A) = (C AND D) OR (NOT(C) AND A)};
  When (16 <= t <= 31) {   $f_t$(B,C,D) = (B AND D) OR (C AND NOT(D));
                           $f_t$(A,B,C) = (A AND C) OR (B AND NOT(C));
                           $f_t$(D,A,B) = (D AND B) OR (A AND NOT(B));
                           $f_t$(C,D,A) = (C AND A) OR (D AND NOT(A))};
  When (32 <= t <=47) {    $f_t$(B,C,D) = (B XOR C XOR D);
                           $f_t$(A,B,C) = (A XOR B XOR C);
                           $f_t$(D,A,B) = (D XOR A XOR B);
                           $f_t$(C,D,A) = (C XOR D XOR A)};
  When (48 <= t <=63) {    $f_t$(B,C,D) = C XOR (B OR NOT(D));
                           $f_t$(A,B,C) = B XOR (A OR NOT(C));
                           $f_t$(D,A,B) = A XOR (D OR NOT(B));
                           $f_t$(C,D,A) = D XOR (C OR NOT(A))};
  When (t=00,04,08,12,16,20,24,28,32,36,40,44,48,52,56,60)
    {A = B + ((A + $f_t$(B,C,D) + $M_j$ + $T_t$) <<<S) };
  When (t=01,05,09,13,17,21,25,29,33,37,41,45,49,53,57,61)
    {D = A +((D + $f_t$(A,B,C) + $M_j$ + $T_t$) <<<S) };
  When (t=02,06,10,14,18,22,26,30,34,38,42,46,50,54,58,62)
    {C = D + ((C + $f_t$(D,A,B) + $M_j$ + $T_t$) <<<S) };
  When (t=03,07,11,15,19,23,27,31,35,39,43,47,51,55,59,63)
    {B = C + ((B + $f_t$(C,D,A) + $M_j$ + $T_t$) <<<S) };
e. H0=A+H0; H1=B+H1; H2=C+H2; H3=D+H3

In the alternate embodiment, processing time is reduced which in turn reduces the processing time necessary for message digest generation. As was done for the SHA algorithm, the value of a subsequent cycle was replaced in the previous cycle resulting in the processing of two equations in the same cycle. The result is that generation of the message digest will take thirty three cycles to complete. The original MD5 equations are as follows:

$$A[t-1]=B[t-2]+((F(B[t-2],C[t-2],D[t-2])+A[t-2]+M[ja]+T[t])<<<Sa)$$

$$D[t]=A[t-1]+((D[t-2]+F(A[t-1],B[t-2],C[t-2])+M[jb]+T[t])<<<Sb)$$

By determining D[t] in terms of [t-2], the equations become:

$$D[t-1] = B[t-2] + ((F(B)[t-2], C[t-2], D[t-2]) + A[t-2] + M[ja] + T[t-1])\lll Sa) +$$
$$((D[t-2] +$$
$$F((B[t-2] + ((F(B[t-2], C[t-2], D[t-2] + A[t-2] + M[ja] + T[t-1])\lll Sa)),$$
$$B[t-2], C[t-2]) + M[jb] + T[t-1])\lll Sb)$$

$$B[t] = D[t-1] + ((C[t-1] + ft(D[t-1], A[t-1], B[t-1]) + Mj + Tt-1)\lll S) +$$
$$((B[t-1] + ft((D[t-1] + ((C[t-1] + ft(D[t-1], A[t-1], B[t-1]) + Mj + Tt-1)$$
$$\lll S)), D[t-1], A[t-1]) + Mj + Tt)\lll S)$$

Thus, when utilizing the present invention, generating the 128-bit message digest requires thirty two+one cycles versus the sixty four cycles plus one cycle required by the original MD5 algorithm.

The following is the message generation algorithm for the alternative embodiment. While the alternative embodiment comprises the message generation algorithm described below, it is understood that the preferred message digest generation algorithm may be varied without exceeding the scope of this disclosure.

--- a. if the data block is less than 512-bit it should be padded
b. Divide a 512-bit message M into 8 64-bit words W[0], . . ., W[8]
    W[0] is the leftmost word. Transfer them to the engine
    Internally they will split into 32-bit chunks.
c. Let A = $H_0$, B = $H_1$, C = $H_2$, D = $H_3$;
d. For (t = 0; t= 31; t++)do
    When (t=00,02,04,06) {Sa = 07, Sb = 12_56 ;
    When (t=01,03,05,07) {Sa = 17, Sb = 22};
    When (t=08,10,12,14) {Sa = 05, Sb = 09};
    When (t=09,11,13,15) {Sa = 14, Sb = 20};
    When (t=16,18,20,22) {Sa = 04, Sb = 11};
    When (t=17,19,21,23) {Sa = 16, Sb = 23};
    When (t=24,26,28,30) {Sa = 06, Sb = 10};
    When (t=25,27,29,31) {Sa = 15, Sb = 21};
    When (t=00) {ja = 00, jb = 01}; When (t=01) {ja = 02, jb = 03};
    When (t=02) {ja = 04, jb = 05}; When (t=03) {ja = 06, jb = 07};
    When (t=04) {ja = 08, jb = 09}; When (t=05) {ja = 10, jb = 11};
    When (t=06) {ja = 12, jb = 13}; When (t=07) {ja = 14, jb = 15};
    When (t=08) {ja = 01, jb = 06}; When (t=09) {ja = 11, jb = 00};
    When (t=10) {ja = 05, jb = 10}; When (t=11) {ja = 15, jb = 04};
    When (t=12) {ja = 09, jb = 14}; When (t=13) {ja = 03, jb = 08};
    When (t=14) {ja = 13, jb = 02}; When (t=15) {ja = 07, jb = 12};
    When (t=16) {ja = 05, jb = 08}; When (t=17) {ja = 11, jb = 14};
    When (t=18) {ja = 01, jb = 04}; When (t=19) {ja = 07, jb = 12};
    When (t=20) {ja = 13, jb = 00}; When (t=21) {ja = 03, jb = 06};
    When (t=22) {ja = 09, jb = 12}; When (t=23) {ja = 15, jb = 02};
    When (t=24) {ja = 00, jb = 07}; When (t=25) {ja = 14, jb = 05};
    When (t=26) {ja = 12, jb = 03}; When (t=27) {ja = 10, jb = 01};
    When (t=28) {ja = 08, jb = 15}; When (t=29) {ja = 06, jb = 13};
    When (t=30) {ja = 04, jb = 11}; When (t=31) {ja = 02, jb = 09};
    When ( 0 <= t <= 07) {    $f_t$(B,C,D) = (B AND C) OR (NOT(B) AND D);
                                $f_t$(A,B,C) = (A AND B) OR (NOT(A) AND C);
                                $f_t$(D,A,B) = (D AND A) OR (NOT(D) AND B);
                                $f_t$(C,D,A) = (C AND D) OR (NOT(C) AND A)};
    When (08 <= t <= 15) {    $f_t$(B,C,D) = (B AND D) OR (C AND NOT(D));
                                  $f_t$(A,B,C) = (A AND C) OR (B AND NOT(C));
                                  $f_t$(D,A,B) = (D AND B) OR (A AND NOT(B));
                                  $f_t$(C,D,A) = (C AND A) OR (D AND NOT(A))};
    When (16 <= t <= 23) {    $f_t$(B,C,D) = (B XOR C XOR D);
                                  $f_t$(A,B,C) = (A XOR B XOR C);
                                  $f_t$(D,A,B) = (D XOR A XOR B);
                                  $f_t$(C,D,A) = (C XOR D XOR A)};
    When (24 <= t <= 31) {    $f_t$(B,C,D) = C XOR (B OR NOT(D));
                                  $f_t$(A,B,C) = B XOR (A OR NOT(C));
                                  $f_t$(D,A,B) = A XOR (D OR NOT(B));
                                  $f_t$(C,D,A) = D XOR (C OR NOT(A))};
    When (t=00,02,04,06,08,10,12,14,16,18,20,22,24,26,28,30)
    {        A' = B + ((A + $f_t$(B,C,D) + $M_{ja}$ + $T_t$) <<<Sa);
            D = B +(B + (($f_t$B,C,D) + A + $M_{ja}$ + $T_t$) <<<Sa)) +
                ((F(A',B,C) + D + $M_{jb}$ + $T_t$) <<<Sb)};
    When (t=01,03,05,07,09,11,13,15,17,19,21,23,25,27,29,31)
    {        C' D + ((C + $f_t$(D,A,B) + $M_{ja}$ + $T_t$) <<<S);
            B = D + (D + ((F(D,A,B) + C + $M_{ja}$ + $T_t$) <<<Sa)) +
                ((F(C',D,A) + B + $M_{Jb}$ + $T_t$) <<<Sb)};
e. H0=A=A+H0; H1=B=B+H1; H2=C=C+H2; H3=D=D+H3

---

Hardware Implementation

Figure 6:
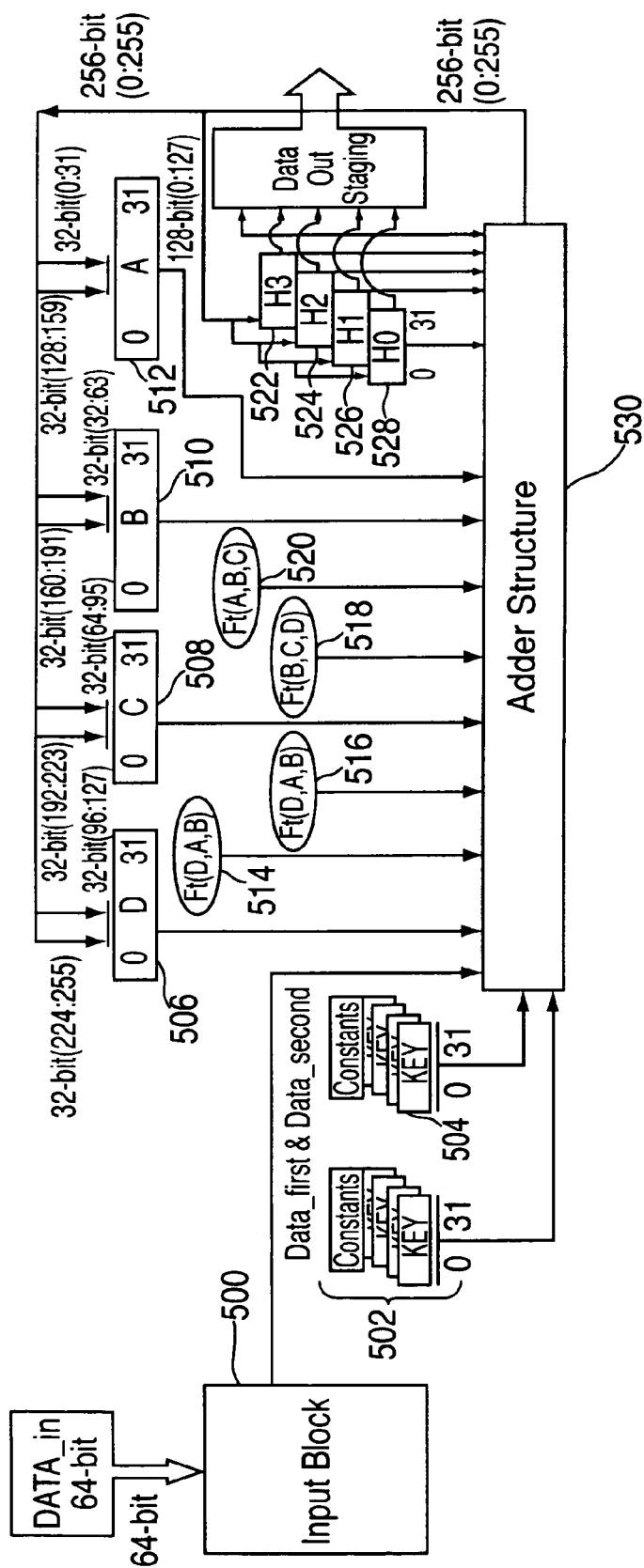
FIG. 6 is a hardware diagram for an implementation of a 128-bit message digest generator requiring at most 33 cycles to generate the 128-bit message.
Figure 7:
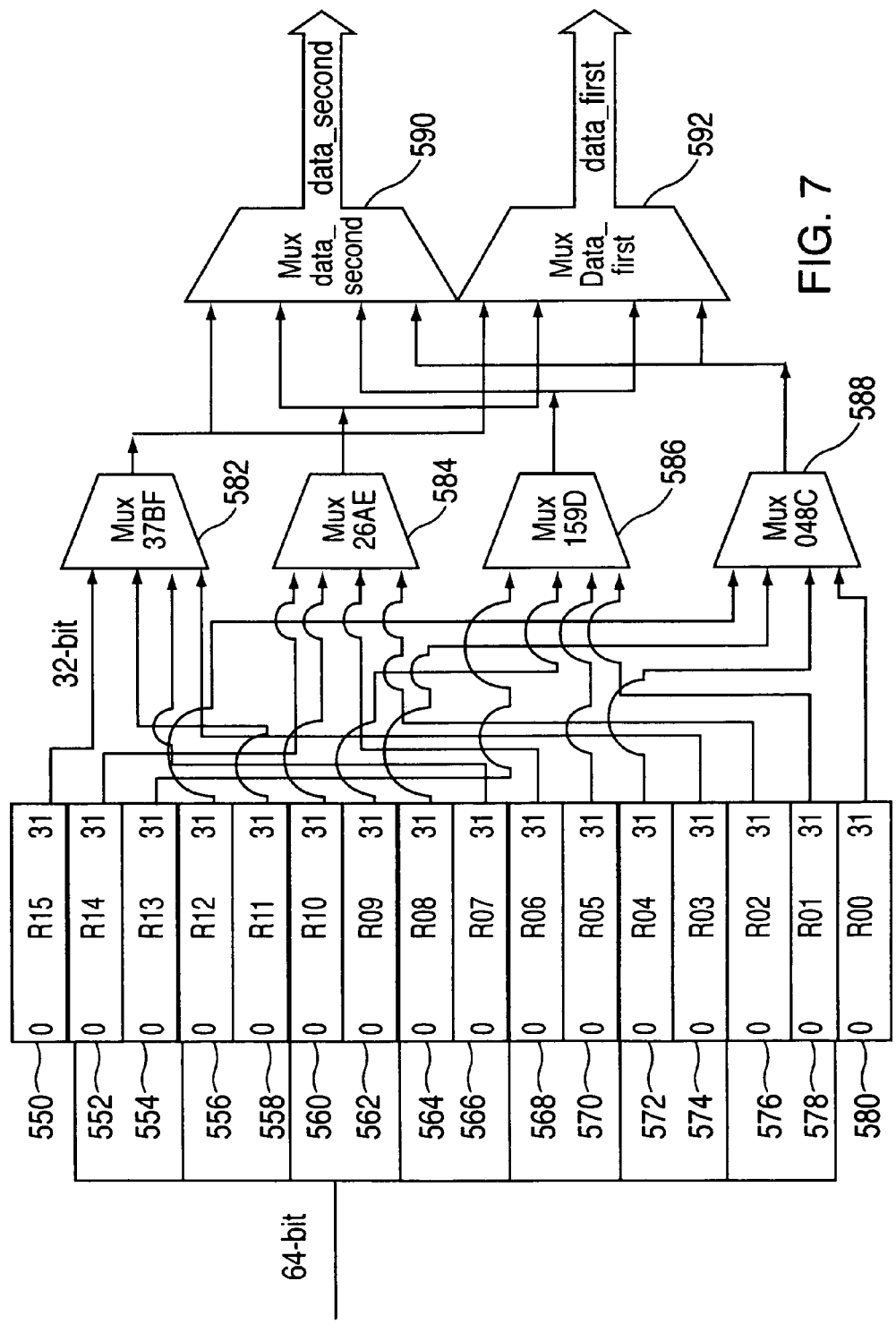
FIG. 7 is a detailed diagram of the input block structure shown in FIG. 6.
Figure 8:
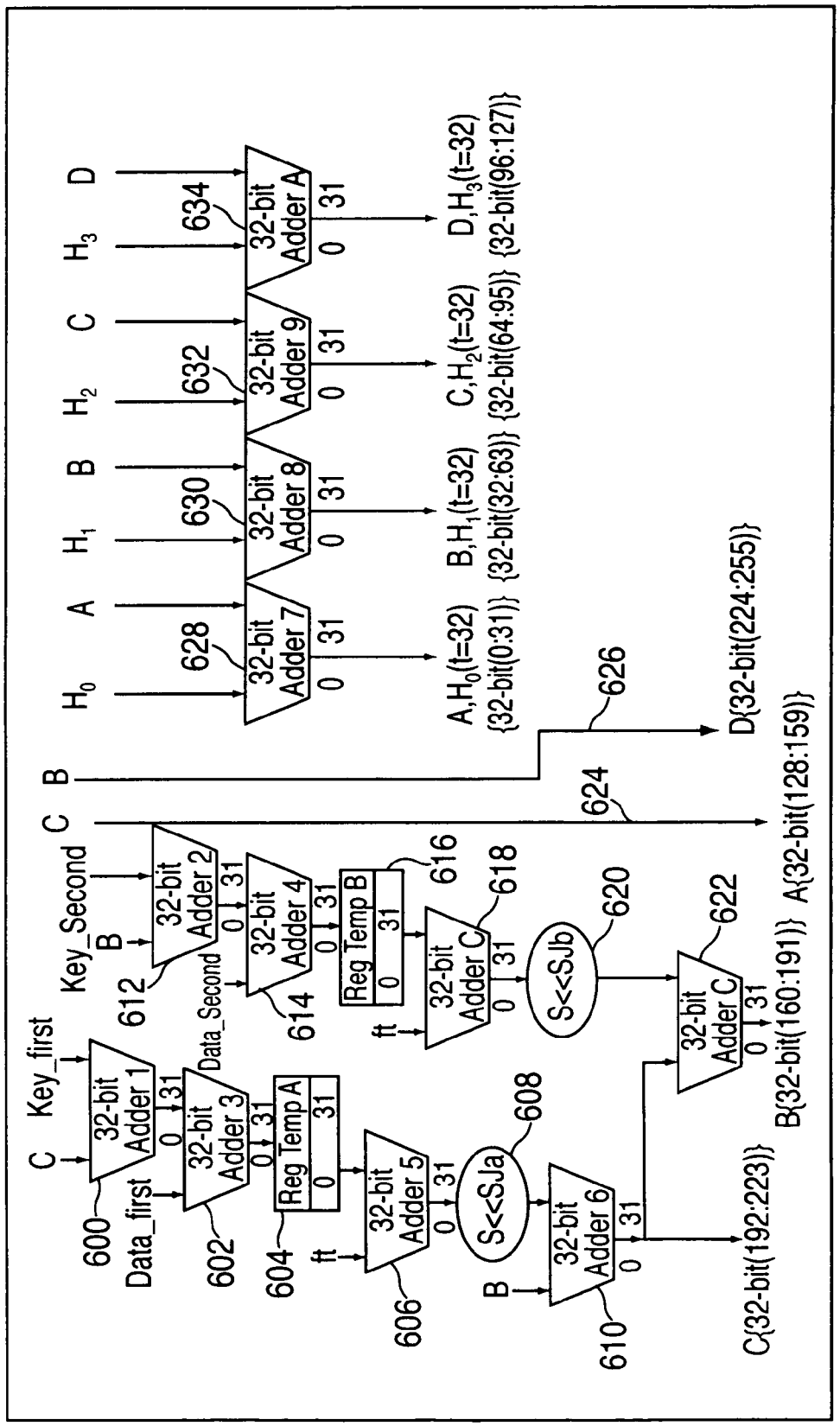
FIG. 8 is a detailed diagram of the adder structure shown in FIG. 6.

FIGS. 6, 7, and 8 show an exemplary hardware implementation for the exemplary MD5 algorithm discussed above. It is understood that the message digest generation algorithm may be implemented using any hardware technology know to one of ordinary skill in the art and that use of alternative hardware technologies does not exceed the scope of the present disclosure. Moreover, it is understood that the message digest generation algorithm may be implemented using any combination of constructs known to one of ordinary skill in the art, including registers, adders, multiplexors (MUX), AND gates, OR gates, and XOR gates, and thus such a hardware implementation is not limited to the exemplary hardware implementation disclosed herein.

For the purposes of this disclosure, when referring directly to a register or other construct, it is understood to be a reference to a value contained therein where the context of the reference dictates such.

Referring to FIG. 6. Data is received by a data input block 500. Adder structure 530 receives data values from data input block 500, constant key registers 502 and 504, registers A through D at 506–512, registers H0 through H3 at 522–528. Adder structure 530 also receives values according to Ft(D,A,B) at 514, Ft(D,A,B) at 516, Ft(B,C,D) at 518, and Ft(A,B,C) at 520. The output from adder structure 530 is stored to registers A through D at 506–512 and registers H0 through H3 at 522–528.

FIG. 7 further depicts input block 500 of FIG. 6. Registers R00 through R15 receive data. MUX 582 receives values from registers R03 at 574, R07 at 566, R11 at 558, and R15 at 550. MUX 584 receives values from registers R02 at 576, R06 at 568, R10 at 560, and R14 at 552. MUX 586 receives values from registers R01 at 578, R05 at 570, R09 at 562, and R13 at 554. MUX 588 receives values from registers R00 at 580, R04 at 572, R08 at 564, and R12 at 556. MUX 590 and MUX 592 each receives values from MUX 582, MUX 584, MUX 586, and MUX 588.

FIG. 8 further depicts adder structure 530 of FIG. 6, wherein t=the current cycle and n=the total number of cycles. For t=0 to t=n−1, the adder structure 530 performs the following. Adder 600 receives input values from constant keys 502 and register C at 508. The outputs of adder 600 and MUX 592 are input to adder 602. The output of adder 602 is input to register 604. Ft and values stored in register 604 are input to adder 606. The shift left Sja bits 608 of the output of adder 606 is input along with B at 510 to adder 610. The output of adder 610 is stored to register C at 508. Adder 612 receives values from constant keys 504 and register C at 508. The outputs of adder 612 and MUX 590 are input to adder 614. The output of adder 614 is stored to register 616. The values stored in register 616 and Ft are input to adder 618. The shift left Sjb bits 620 of the output of adder 618 is input along with the output of adder 610 to adder 622. The output of adder 622 is stored to register B at 510. The value of register C at 508 is stored at 624 to register A at 512. The value of register B at 510 is stored at 626 to register D at 506.

For t=n the adder structure 406 performs the following. Registers $H_0$ at 528 and A at 512 are applied as input to adder 628. The output of adder 628 is stored back to registers A at 512 and $H_0$ at 528. Registers $H_1$ at 526 and B at 510 are applied as input to adder 630. The output of adder 630 is stored back to registers $H_1$ at 526 and B at 510. Registers $H_2$ at 524 and C at 508 are applied as input to adder 632. The output of adder 632 is stored back to registers $H_2$ at 524 and C at 508. Registers $H_3$ at 522 and D at 506 are applied as input to adder 634. The output of adder 634 is stored back to registers $H_3$ at 522 and D at 506.

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

The invention claimed is:

1. A system generating a message digest, via a computer, said system comprising:
    a memory storage location for receiving a block of data; and
    a processor for processing said block of data to acquire said message digest, said processing of said block of data includes (i) evaluating said block of data at cycle=t in terms of cycle=(t−x), wherein x is greater than or equal to 2, and (ii) skipping one cycle per iteration in order to reduce a total number of cycles utilized for said processing of said block of data;
    wherein said block of data is 512-bits;
    wherein said message digest comprises 160-bits;
    wherein said processor performs the following:

$$E(t)=C(t-2);$$

$$D(t)=S30\ [B(t-2)];$$

$$C(t)=S30\ [A(t-2)];$$

$$B(t)=S5(A(t-2))+ft(B(t-2),C(t-2),D(t-2))+E(t-2)+Wt-1+Kt-1;\ \text{and}$$

$$A(t) = S5(S5(A(t-2)) + ft(B(t-2), C(t-2), D(t-2)) + E(t-2) + Wt-1 + Kt-1) +$$
$$ft(A(t-2), S30[B(t-2)], C(t-2)) + D(t-2) + Wt + Kt =$$
$$S5(B(t)) + ft(A(t-2), S30[B(t-2)], C(t-2)) + D(t-2) + WT + Kt;$$

where A, B, C, D, E and W are words of a message, K is a constant word, f is a logical function, Sx represents a value circularly rotated by x bits;
    said processor generating said message digest providing a message fingerprint for said data.

2. A system generating a message digest, via a computer, said system comprising:
    a memory storage location for receiving a block of data; and
    a processor for processing said block of data to acquire said message digest, said processing of said block of data includes (i) evaluating said block of data at cycle=t in terms of cycle=(t−x), wherein x is greater than or equal to 2, and (ii) skipping one cycle per iteration in order to reduce a total number of cycles utilized for said processing of said block of data;
wherein said block of data is 512-bits;
wherein said message digest comprises 128-bits;
wherein said processor performs the following:

$$D[t-1] = B[t-2] + ((F(B)[t-2], C[t-2], D[t-2]) + A[t-2] + M[ja] + T[t-1]) \langle\langle\langle Sa \rangle +$$
$$((D[t-2] + F((B[t-2] + ((F(B[t-2], C[t-2], D[t-2] + A[t-2] + M[ja] + T[t-1])$$
$$\langle\langle\langle Sa \rangle), B[t-2], C[t-2]) + M[jb] + T[t-1]) \langle\langle\langle Sb \rangle; \text{ and}$$

$$B[t] = D[t-1] + ((C[t-1] + ft(D[t-1], A[t-1], B[t-1]) + Mj + Tt - 1) \langle\langle\langle S \rangle +$$
$$((B[t-1] + ft((D[t-1] + ((C[t-1] + ft(D[t-1], A[t-1], B[t-1]) + Mj + Tt - 1)$$
$$\langle\langle\langle S \rangle), D[t-1], A[t-1]) + Mj + Tt) \langle\langle\langle S \rangle;$$

where A, B, C, D, E and W are words of a message, F is a function, M is a message block, T is a value from a table and S represents a shifting function;
said processor generating said message digest providing a message fingerprint for said data.

3. A system generating a message digest, via a computer, said system comprising:
a memory storage location for receiving a block of data; and
a processor for processing said block of data to acquire said message digest, said processing of said block of data includes;
if a message is less than m bits, then padding said message;
dividing said message into n words, said n words further comprising W[0] through W[n];
performing the following:
setting A equal to H0,
setting B equal to H1,
setting C equal to H2,
setting D equal to H3,
setting E equal to H4;
establishing a counter for storing a value used in performing iteration, said counter being referred to as t;
setting t to an initial value;
setting a terminal value to an initial value;
for t not equal to said terminal value, iteratively performing steps a–e:
a. setting S equal to (T AND MASK);
b. if t is greater than or equal to a first defined value, then setting W[t]equal to a the value of a first shiftbit operation;
c. setting TEMP equal to the value of a second shiftbit operation+f(B,C,D)+E+W[s]+$K_t$, wherein $K_t$ further comprises a constant value;
d. performing the following:
setting E equal to D,
setting D equal to C,
setting C equal to the value of a third shiftbit operation,
setting B equal to A,
setting A equal to TEMP;
e. incrementing t; and
performing the following:
setting H0 equal to H0+A,
setting H1 equal to H1+B,
setting H2 equal to H2+C,
setting H3 equal to H3+D,
setting H4 equal to H4+E;
said processor generating said message digest providing a message fingerprint for said data.

4. The system as in claim 3 wherein:
m is equal to 512,
n is equal to 8, and further wherein each word is equal to 64 bits.

5. The system as in claim 4 wherein said first defined value is equal to 8.

6. The system as in claim 4 wherein W[0] is the leftmost word.

7. The system as in claim 4 wherein said MASK is equal to 0x00000007.

8. The system as in claim 4 wherein said initial value of t is equal to 0, further wherein said terminal value is less than or equal to 39.

9. The system as in claim 8, further comprising the following:
if t is greater than or equal to 0 and t is less than or equal to 9, then perform the following:
setting $f_t$ (B,C,D) equal to (B AND C) OR (NOT(B) AND D),
setting $f_t$ (A,B,C) equal to (A AND B) OR (NOT(A) AND C);
if t is greater than or equal to 10 and t is less than or equal to 19, then perform the following:
setting $f_t$ (B,C,D) equal to (B XOR C XOR D),
setting $f_t$ (A,B,C) equal to (A XOR B XOR C);
if t is greater than or equal to 20 and t is less than or equal to 29, then perform the following:
setting $f_t$ (B,C,D) equal to (B AND C) OR (B AND D) OR (C AND D),
setting $f_t$ (A,B,C) equal to (A AND B) OR (A AND C) OR (B AND C); and
if t is greater than or equal to 30 and t is less than or equal to 39, then perform the following:
setting $f_t$ (B,C,D) equal to (B XOR C XOR D),
setting $f_t$ (A,B,C) equal to (A XOR B XOR C).

10. The system as in claim 9 wherein said first shiftbit operation, further comprises the following:
shift1bitleft( W[(t+6) AND MASK] XOR W[(t+3) AND MASK] XOR W[(t+1) and MASK] XOR W[(t+0)]).

11. The system as in claim 10 wherein said second shiftbit operation further comprises the following:
shift5bitsleft(A).

12. The system as in claim 11 wherein said third shiftbit operation further comprises the following:
shift30bitsleft(B).

* * * * *